March 3, 1931.  M. EICHELGRÜN  1,795,112
INCLINED PLANE CURVED SWITCH
Filed Dec. 24, 1929  3 Sheets-Sheet 1
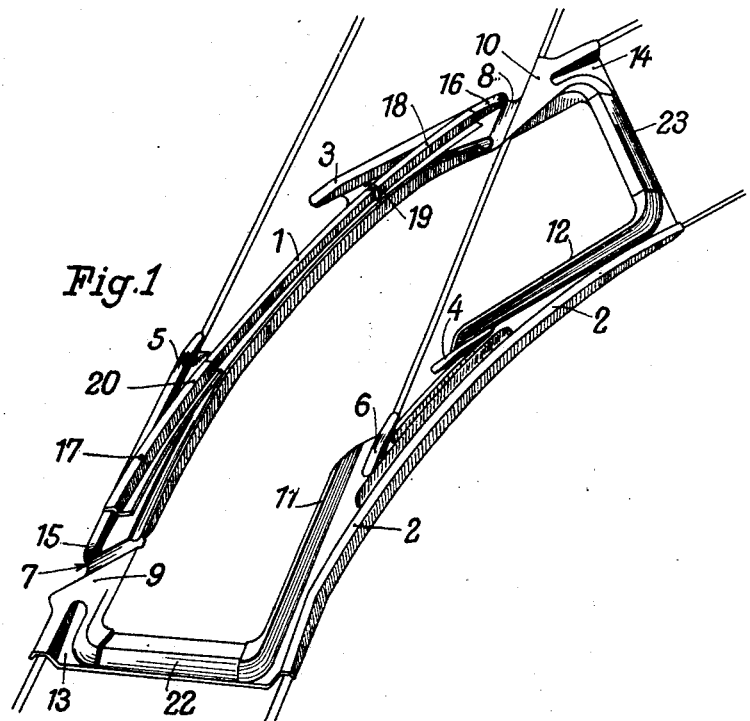
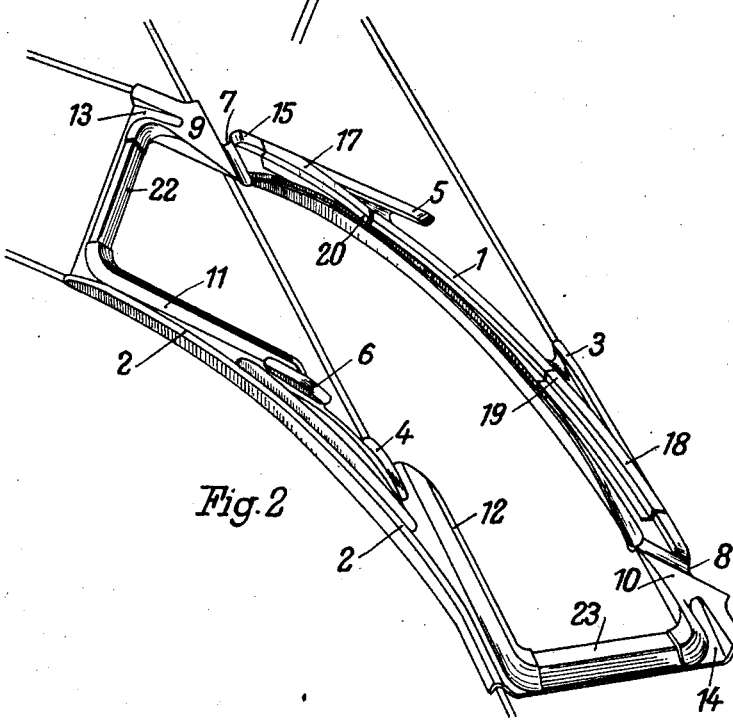
Inventor:
Martin Eichelgrün
by [signature]
Attorney

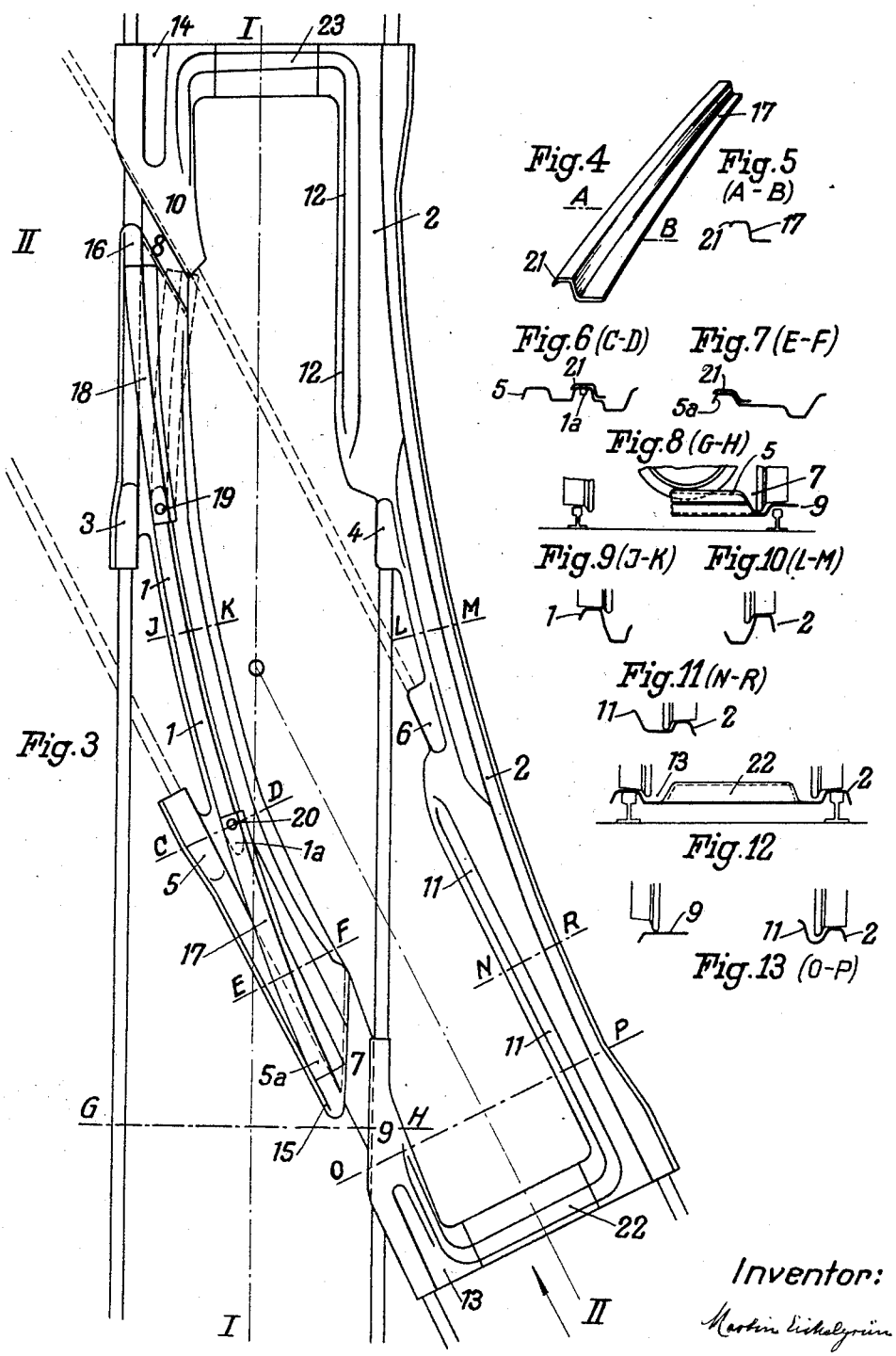

March 3, 1931.  M. EICHELGRÜN  1,795,112
INCLINED PLANE CURVED SWITCH
Filed Dec. 24, 1929  3 Sheets-Sheet 3
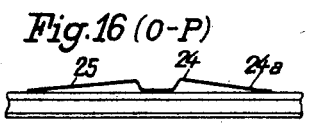
Fig.16 (O-P)
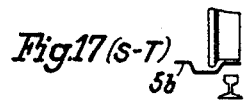
Fig.17 (S-T)
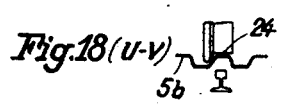
Fig.18 (U-V)
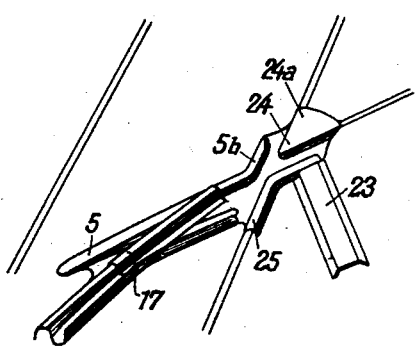
Fig.14
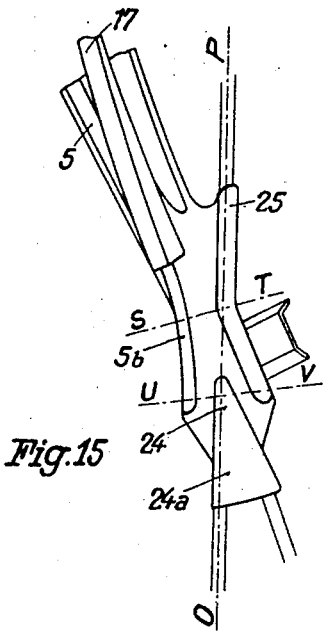
Fig.15
Inventor:
Martin Eichelgrün Patented Mar. 3, 1931

1,795,112

UNITED STATES PATENT OFFICE

MARTIN EICHELGRÜN, OF FRANKFORT-ON-THE-MAIN, GERMANY

INCLINED PLANE CURVED SWITCH

Application filed December 24, 1929, Serial No. 416,256, and in Germany May 4, 1929.

Simple curve track frames are already known, which can be used as right and left switches by turning in their plane. These curve track frames do not allow of the straight track being travelled over. The curve track frame must be removed from the track if straight track is to be travelled over.

Inclined plane switches are also known, which can be used as right or left switches and at the same time allow the straight track to be used. In these inclined plane switches the track rails for one direction of travel are also the grooves for the other travelling direction. These switches have long straight track rails for travelling over the straight track and are therefore so heavy that they can only be turned by two men. Besides which they have a crossing which is very complicated to forge.

By the improvement hereinafter described an inclined plane switch is produced which can serve as right and left switch and at the same time allows the use of the straight track. The new inclined plane switch is so light that it can easily be turned by one man. Only its upper surface is travelled over. The new inclined plane switch is a development of the curve track frame first referred to above.

An embodiment of the invention is illustrated by way of example in the accompanying drawing in which:

Fig. 1 shows the inclined plane switch in perspective arranged as right switch.

Fig. 2 is a view similar to that shown in Fig. 1 the switch being however arranged as left switch.

Fig. 3 is a top plan view of the inclined plane switch.

The remaining Figures 4 to 18 show constructional details of the switch.

1 and 2 are the bent track rails. 3, 4, 5, 6 are facing and tailing tongues extending tangentially to the bent track rails 1 and 2. 7 and 8 are grooves arranged in the bent track rails 1 at the commencement of the running on and running off tongues 3 and 5 respectively in order to leave a free passage for the wheel flanges of the cars, after the car wheels have run off the tongues 3, 4 or 5, 6 respectively and have again reached the rail level.

Through these grooves 7 and 8 and the level surfaces arranged at the sides of the same for the wheel flanges of the wheels travelling on the straight track, the wheels of the cars travelling on the curved line of rails of the switch would jump the track. The guiding is however obtained by providing a double guide on the opposite side on the curved track rail 2 by means of an upwardly projecting bridge piece 11 or 12 respectively.

When travelling into the switch in the direction of the arrow (Fig. 3), the flanges of the wheels are led up by the track rail 2 on the one side whereas on the other side the wheels run up on their flanges in the groove 13 over the flat surface 9 and over the groove 7 and reach the track rail 1 at 15.

In order to determine the travelling direction two tongues 17 and 18 are used, which are swivelled on the bolts 19 and 20. The tongue 18 is shown in dotted lines in Fig. 3 in a position giving free passage for the straight line of rails I—I. The tongue 17 is only actuated when the switch is used as right switch and when it is intended to give free the through-line of rails II—II. On the other hand, when the switch is used as left switch, the tongue 17 remains in the position shown in dotted lines in Fig. 3 with through-line of rails I—I freed for passage.

In order to be able to make the tongues cheaply, that is of sheet metal, the tongues have been given the new Z-like shape shown in Fig. 4. The tongues 17 and 18 respectively serve only as guiding elements, whereas the parts 5a and 1a of the track rails 5 and 1, situated thereunder, take up the wheel stresses. A nose 21 arranged at the side of the Z-profile engages over the track rail situated under the tongue and prevents self-displacement of the tongue. For connecting the two curved lines of rail 1 and 2 ties 22 and 23 are arranged, one at each end of the switch.

Figs. 5 to 13 show sections corresponding to the section lines indicated by letters in Figs. 3 and 4. For the grooves 7, 8 and the joining flat surfaces 9, 10 the crossing shown in Figs. 14 to 18 may be substiuted. This arrangement presents the advantage, that the car wheel, after leaving the tongue 17 or 18 respectively, has not to run over any flat surfaces and grooves with its flange, its flange running on onto the track rail 5b leading up to the crossing to be taken over by the point 24 of the crossing without shock, which point allows the wheel to run off onto the rail head like the running-on tongue of the track rail 2. In travelling over the straight line of rails I—I one wheel of the car axle continues to run on the rail, whereas the other wheel is raised by the running-on tongue 25 extending through the crossing 24 and is again lowered onto the head of the rail by its downwardly inclined surface 24a (Fig. 16).

I claim:—

1. An inclined plane curved switch, comprising in combination a bent curved frame composed of curved track rails one of said track rails having grooves, tangential extending running-on and running-off tongues connected to said frame at the point where said grooves begin, and upwardly projecting guide bridges mounted on the track rail without grooves.

2. An inclined plane curved switch, comprising in combination with a bent curved frame composed of track rails connected by a tie at each end and tangentially extending running-on and running-off tongues connected to said rail the tongues made of sheet metal pressed to Z-shaped cross-section adapted to guide the wheels, the supporting of the wheels being effected by the track rails situated under said tongues.

3. An inclined plane curved switch, comprising in combination with a bent curved frame composed of track rails connected by a tie at each end and tangentially extending running-on and running-off tongues connected to said rail the tongues of Z-section mounted on said rail, and a nose on each of said tongues engaging over the track rail situated under said tongues.

4. An inclined plane curved switch, comprising in combination with a bent curved frame composed of straight and bent lines of rails, crossings arranged between said straight and bent lines of rails said crossings having running-on and running-off surfaces allowing the straight line of rails to be travelled over, one of the wheels continuing to run on the track rail the other wheel travelling over said crossing owing to the gently inclined running on and running off surfaces.

In testimony whereof I affix my signature.

MARTIN EICHELGRÜN.